United States Patent
Mertell et al.

(10) Patent No.: US 8,202,028 B2
(45) Date of Patent: Jun. 19, 2012

(54) GENERATOR SET WITH DUAL MOUNTING CAPABILITY

(75) Inventors: Martin Murphy Mertell, Liverpool, NY (US); John T. Steele, Marcellus, NY (US); Paul J. Krause, Cato, NY (US); Ping S. Vang, Liverpool, NY (US); Cheryl M. Keiling, Camillus, NY (US)

(73) Assignee: Carrier Corporation, Farmington, CT (US)

( * ) Notice: Subject to any disclaimer, the term of this patent is extended or adjusted under 35 U.S.C. 154(b) by 803 days.

(21) Appl. No.: 12/064,895

(22) PCT Filed: Sep. 13, 2006

(86) PCT No.: PCT/US2006/035420
§ 371 (c)(1),
(2), (4) Date: Feb. 26, 2008

(87) PCT Pub. No.: WO2007/035318
PCT Pub. Date: Mar. 29, 2007

(65) Prior Publication Data
US 2008/0231239 A1 Sep. 25, 2008

Related U.S. Application Data

(60) Provisional application No. 60/717,424, filed on Sep. 15, 2005.

(51) Int. Cl.
*B60P 7/08* (2006.01)

(52) U.S. Cl. ........................................................ 410/80
(58) Field of Classification Search .................. 410/77, 410/80, 81, 82, 91; 322/1; 290/1 A
See application file for complete search history.

(56) References Cited

U.S. PATENT DOCUMENTS

| | | | |
|---|---|---|---|
| 4,549,405 A | 10/1985 | Anderson et al. | |
| 4,834,572 A | 5/1989 | Harrington et al. | |
| 5,181,541 A * | 1/1993 | Bodenheimer | 137/899 |
| 5,498,097 A | 3/1996 | Shapess | |
| 5,590,806 A * | 1/1997 | Green et al. | 220/562 |
| 5,634,605 A | 6/1997 | Rubel et al. | |
| 5,739,675 A * | 4/1998 | Green et al. | 322/1 |
| 5,804,946 A | 9/1998 | Gaubatz et al. | |
| 5,960,637 A | 10/1999 | Stevens et al. | |
| 6,334,746 B1 * | 1/2002 | Nguyen et al. | 410/44 |
| 7,131,804 B2 | 11/2006 | Sawchuk | |
| 2002/0031413 A1 * | 3/2002 | Zavitz | 410/91 |

* cited by examiner

*Primary Examiner* — Glenn Dayoan
*Assistant Examiner* — Sunsurraye Westbrook
(74) *Attorney, Agent, or Firm* — Cantor Colburn LLP

(57) ABSTRACT

A generator set is provided with both a pin-on mount mechanism and a clamp-on mount mechanism for mounting the generator set to a container. Both the pin-on mount mechanism and the clamp-on mount mechanism are selectively positionable in either a deployed for use position or a stowed position. When the clamp-on mount mechanism is in the deployed for use position, the pin-on mount mechanism is positioned in a stowed position. When the pin-on mount mechanism is in the deployed for use position, the clamp-on mount mechanism is positioned in the stowed position.

6 Claims, 9 Drawing Sheets

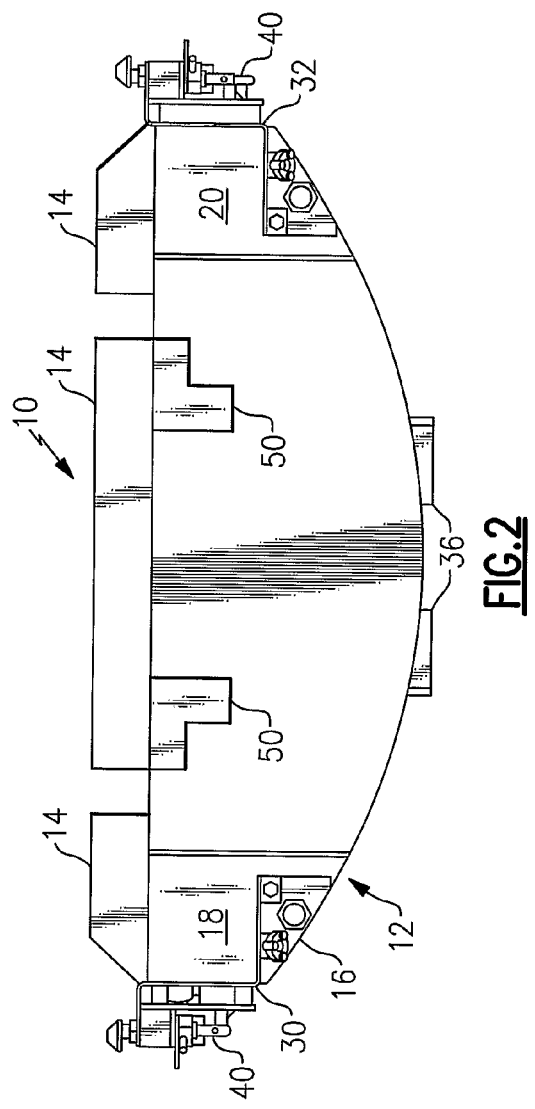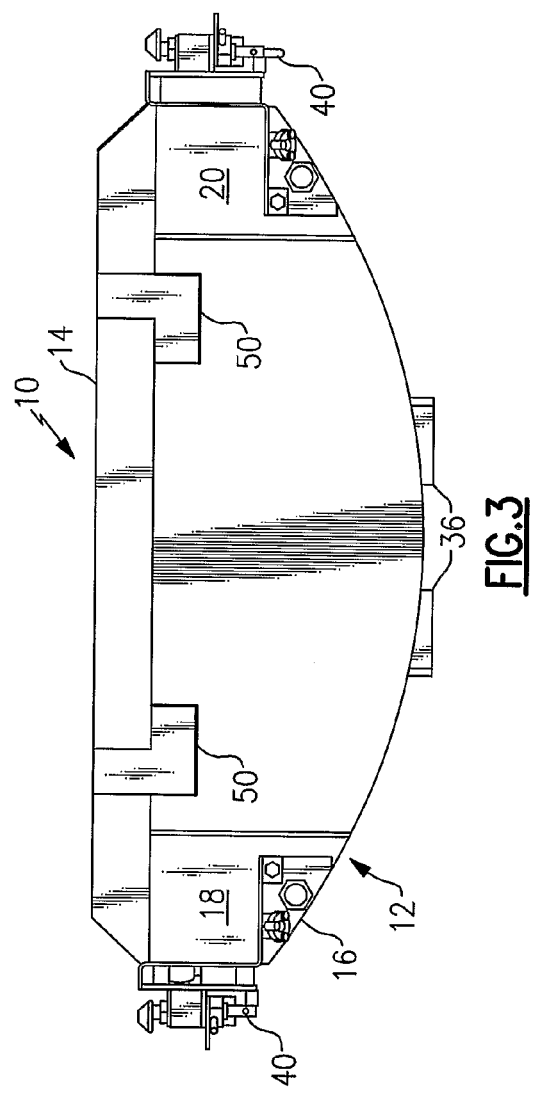

GENERATOR SET WITH DUAL MOUNTING CAPABILITY

CROSS REFERENCE TO RELATED APPLICATION

This application claims priority from and the benefit of U.S. Provisional Application Ser. No. 60/717,424, filed Sep. 15, 2005, and entitled GENERATOR SET WITH DUAL MOUNTING CAPABILITY, which application is hereby incorporated herein in its entirety.

FIELD OF THE INVENTION

This invention relates generally to mounting generator sets to containers and, more specifically, to facilitating the mounting of generator sets to refrigerated freight containers.

BACKGROUND OF THE INVENTION

Refrigerated freight containers require an electric motor for driving a refrigerant compressor. The electric motor requires an external electric power source which may be readily found on ship or at the storage site. However, when the container is in transit by rail or truck, a diesel powered generator set is typically used as a means of power supply to the container's refrigeration unit. Commonly known as a "gen set", the generator set, which typically includes a diesel engine driven generator, is adapted to be face mounted to the frame of the freight container. Representative gensets of this type are disclosed, for example, in U.S. Pat. Nos. 5,739,675 and 5,804,946, the entire disclosures of each of which are hereby incorporated herein by reference.

The transport refrigeration industry has established International Standards Organization (ISO) standards for container, refrigeration and genset designs which are integral to the market. ISO standards not only specify operational guidelines, but physical size constraints as well as means of mounting. ISO standards for container designs have established two industry acceptable means of mounting face mounted gensets, pin-on mounts and clamp-on mounts. One type of clamp-on mount designed for a mounting generator set to a transport freight container is disclosed in U.S. Pat. No. 5,498,097, the entire disclosure of which is hereby incorporated herein by reference.

To date, genset users have specified one or the other of these mounting mechanisms for use in connection with their refrigerated containers. Thus, a genset provided with clamp-on mounts could not be mounted to a container designed to accommodate pin-on mount gensets. Similarly, a genset provided with pin-on mounts could not be mounted to a container designed to accommodate clamp-on mount gensets. Heretofore, redundancy in mounting means has been viewed as unnecessary.

However, a desire has recently developed in the market for gensets having dual mounting capability, that is gensets that are capable of being face mounted in the field in either a pin-on or a clamp-on style. Such a capability would facilitate the use by relatively large shipping companies of both container designs, that is containers designed to accommodate pin-on mounted gensets, as well as containers designed to accommodate clamp-on mounted gensets.

SUMMARY OF THE INVENTION

It is an object of the present invention to provide a generator set having both pin-on style and clamp-on style mounting capability for face mounting to a container.

It is an object of an aspect of the invention to provide a pin-on mount that is selectively positionable between a deployed position and a stowed position.

It is an object of an aspect of the invention to provide a clamp-on mount that is selectively positionable between a deployed position and a stowed position.

It is an object of a further aspect of the present invention to provide a genset having dual mount capability for face mounting to a container without impacting structural integrity and physical size constraints for the generator set.

A generator set is provided with both a pin-on mount mechanism and a clamp-on mount mechanism for mounting the generator set to a container. Both the pin-on mount mechanism and the clamp-on mount mechanism are selectively positionable in either a deployed for use position or a stowed position. When the clamp-on mount mechanism is in the deployed for use position, the pin-on mount mechanism is positioned in a stowed position. When the pin-on mount mechanism is in the deployed for use position, the clamp-on mount mechanism is positioned in the stowed position.

In an embodiment, the pin-on mounts include a planar bracket having a downwardly extending support shaft mounted to a structural member of the generator set and a mounting pin disposed in spaced relationship from said support shaft and extending downwardly to engage the refrigerated freight container. The planar bracket may be an L-shaped plate having a first leg and a second leg, with the support shaft extending downwardly from the first leg of the L-shaped plate and the mounting pin extending downwardly from the second leg of the L-shaped plate. The planar bracket may be a rectangular plate having a first end and a second leg, said support shaft extends downwardly from the first end of the rectangular plate and said mounting plate extending downwardly from the second end of the rectangular plate.

In an embodiment, the pin-on mount is a plate adapted to be releasably secured to a structural member of the generator set and a mounting pin supported by the plate to extend downwardly to engage the refrigerated freight container.

In an embodiment, the pin-on mount includes a lower pin body adapted to be secured to an upper pin body. When installed, the upper pin body is positioned on an upper surface of a structural member of the generator set with a portion of the upper pin body extending downwardly through a receiving hole in the structural member and the lower pin body is positioned on a lower side of the structural member in engagement with the upper pin body. In one embodiment, the lower pin body is secured to the upper pin body by means of a bolt inserted upwardly through a central bore in the assembled bodies and threaded to the upper pin body.

In another embodiment, the upper pin body has a threaded shaft extending axially downwardly and the lower pin body has a central core extending coaxially therethrough having a threaded portion adapted to receive and engage the threaded shaft of the upper pin body. In this embodiment, the pin-on mount may also include an anti-rotation pin operatively associated with the upper pin body and the lower pin body when assembled, whereby the assembled upper pin body and lower pin body can not rotate relative to each other. In this embodiment, the pin-on mount may include at least one set screw extending radially through the lower pin body to engage a corresponding groove provided on the shaft of the upper pin body to prevent rotation of the pin body assembly.

BRIEF DESCRIPTION OF THE DRAWINGS

For a further understanding of these and other objects of the invention, reference will be made to the following detailed description of the invention which is to be read in connection with the accompanying drawing, where:

FIG. 2 is a top plan view of the frame of the generator set illustrated in FIG. 1 showing the pin-on mounts in a stowed position and the clamp-on mounts in a deployed position;

FIG. 3 is a top plan view of the frame of the generator set illustrated in FIG. 1 showing the pin-on mounts in a deployed position and the clamp-on mounts in a stowed position;

DETAILED DESCRIPTION OF THE INVENTION

Figure 1:
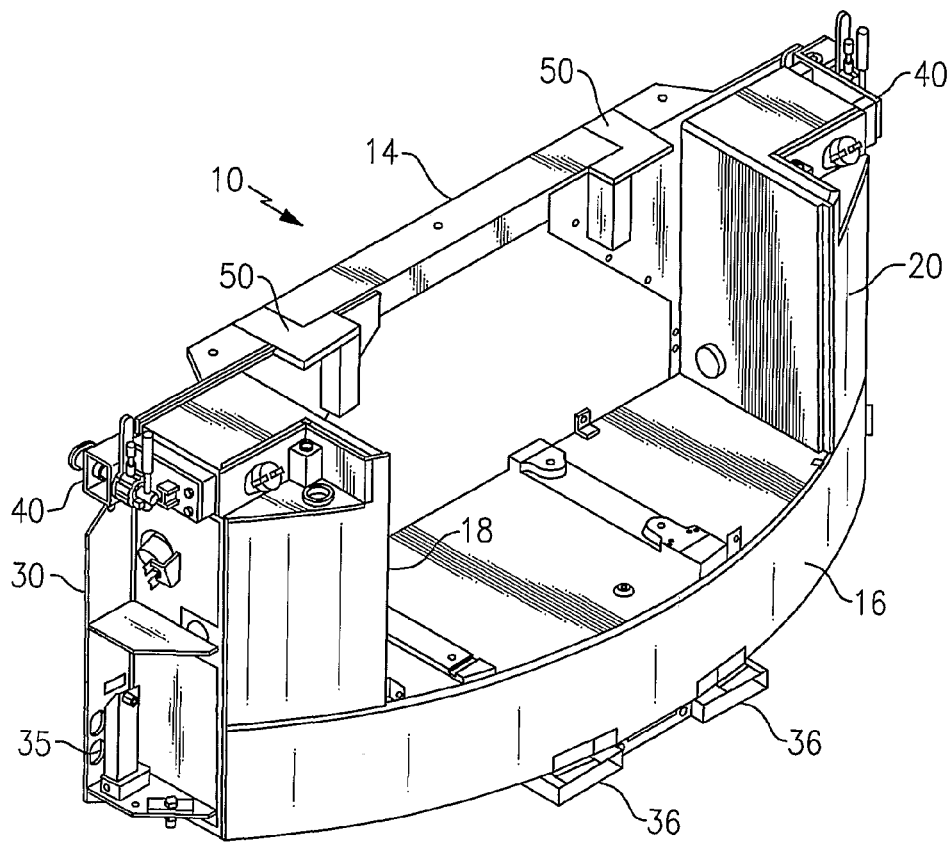
FIG. 1 is a perspective view of the frame of a generator set equipped with both clamp-on mounts and pin-on mounts in accord with the invention.

Referring now to FIGS. 1, 2 and 3, in particular, the structural framework of the generator set 10 comprises a U-shaped fuel tank generally designated by reference numeral 12 and a number of structural elements, including an angle iron 14, which extends across substantially the entire back side of the generator set. The fuel tank 12, fabricated from structural steel plate, includes a lower section 16, which extends across substantially the entire bottom of the generator set 10. Extending from the left and right hand sides of the lower tank 16 are left and right hand tower portions of the fuel tank, 18 and 20, respectively. The structural angle 14 is welded or otherwise secured to the top of the back side of the fuel towers 18 and 20. Other structural elements include left and right hand vertically extending structural members 30 and 32, respectively, located at the left and right hand ends of the generator set. Preferably, these structural elements 30 and 32 are welded to the left and right hand facing surfaces of the fuel tank towers 18 and 20, respectively. The structural elements 30 and 32 include holes 35 through which bolts may be inserted to secure the generator set 10 to a container when the generator set is properly positioned to face mount against the container frame. Underlying the lower portion 16 of the fuel tank 12 are a pair of structural forklift pockets 36, which form an integral part of the generator set structure and facilitate engagement by a forklift for lifting the unit and positioning it for attachment to a refrigerated container.

For face mounting the generator set 10 to the frame of a container, the generator set of the present invention is provided with both clamp-on mounts 40 and pin-on mounts 50. Clamp-on mounts 40 are mounted to the upper end of the structural elements 30 and 32 and are adapted to structurally attach the generator set 10 to a container in a manner well known in the art. Additionally, the pin-on mounts 40 are provided in association with the structural angle 14 for attaching the generator set 10 to a container in a manner well known in the art.

Figure 4:
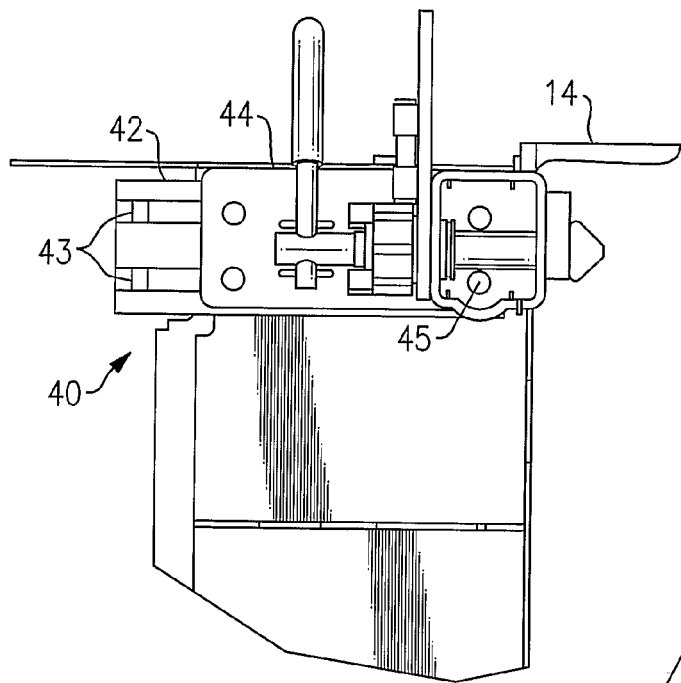
FIG. 4 is an elevation view illustrating the clamp-on mount of FIG. 2 in the deployed position.
Figure 6:
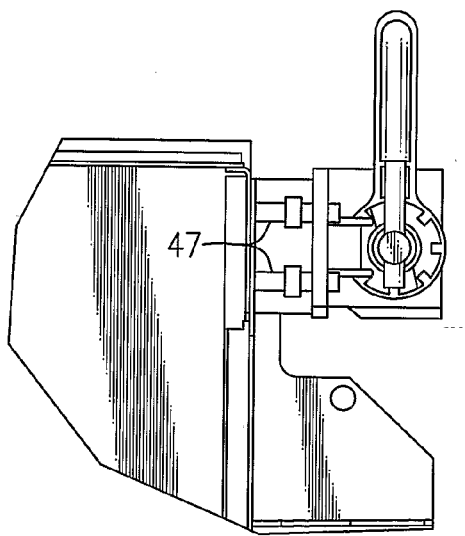
FIG. 6 is a further elevation view of the clamp-on mount.
Figure 5:
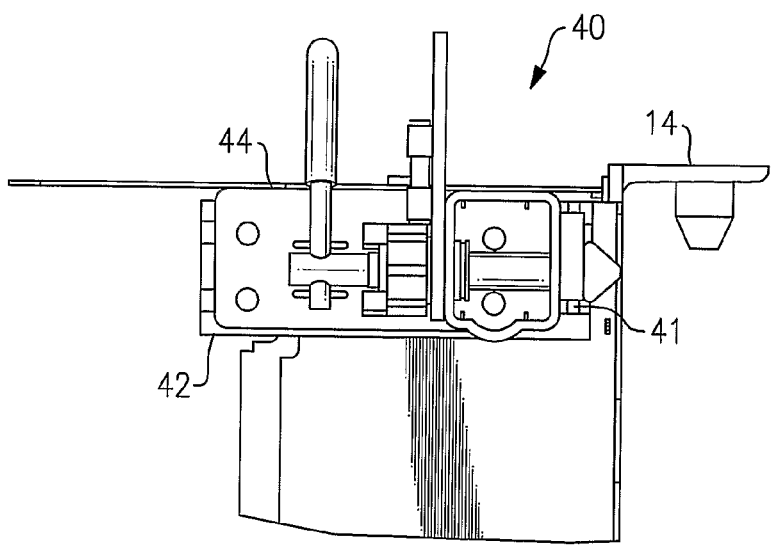
FIG. 5 is an elevation view illustrating the clamp-on mount of FIG. 3 in the stowed position.

Referring now to FIGS. 4, 5 and 6, in the depicted embodiment, each clamp-on mount 40 includes a slide plate 42 that provides a pair of parallel grooves in which the clamp mechanism 44 may slide between a deployed for use position and a stowed position. To deploy the clamp mechanism 44 for use, the clamp mechanism is slid rearwardly along the side plate 42, that is to the right as depicted in FIG. 4. Hard stops 41 are provided in the slide plate for limiting the rearward motion of the clamp mechanism 44 and properly positioning the clamp mechanism in its deployed for use position. To retract the clamp mechanism 44 to its stowed position, the clamp mechanism is slid forwardly along the slide plate 42, that is to the left as depicted in FIG. 5. Hard stops 43 are provided in the slide plate for limiting the forward motion of the clamp mechanism 44 and properly positioning the clamp mechanism in the stowed position when not in use.

Through holes 47 may be provided to allow for clamp mounting bolts to extend appropriately into these holes to provide an additional safety feature in the event that the tee nuts/mountings bolts become loose while the clamp mechanism is in the deployed for use position. Furthermore, these through holes will have adequate relief to expel expected debris (dirt) during normal use of actuation/retraction of assembly preventing full engagement of mounting bolts for its intended additional safety feature. Furthermore, the slide plate 42 of the clamp-on mount 40 is of a minimum length in order to retract the clamp assembly. A guard structure (not shown) may be provided to prevent damage to the slide plate if it extends out beyond the genset face curvature, as this may be a concern at commissioning sites when certain vehicles are used to move containers from one area to another.

Figure 17:
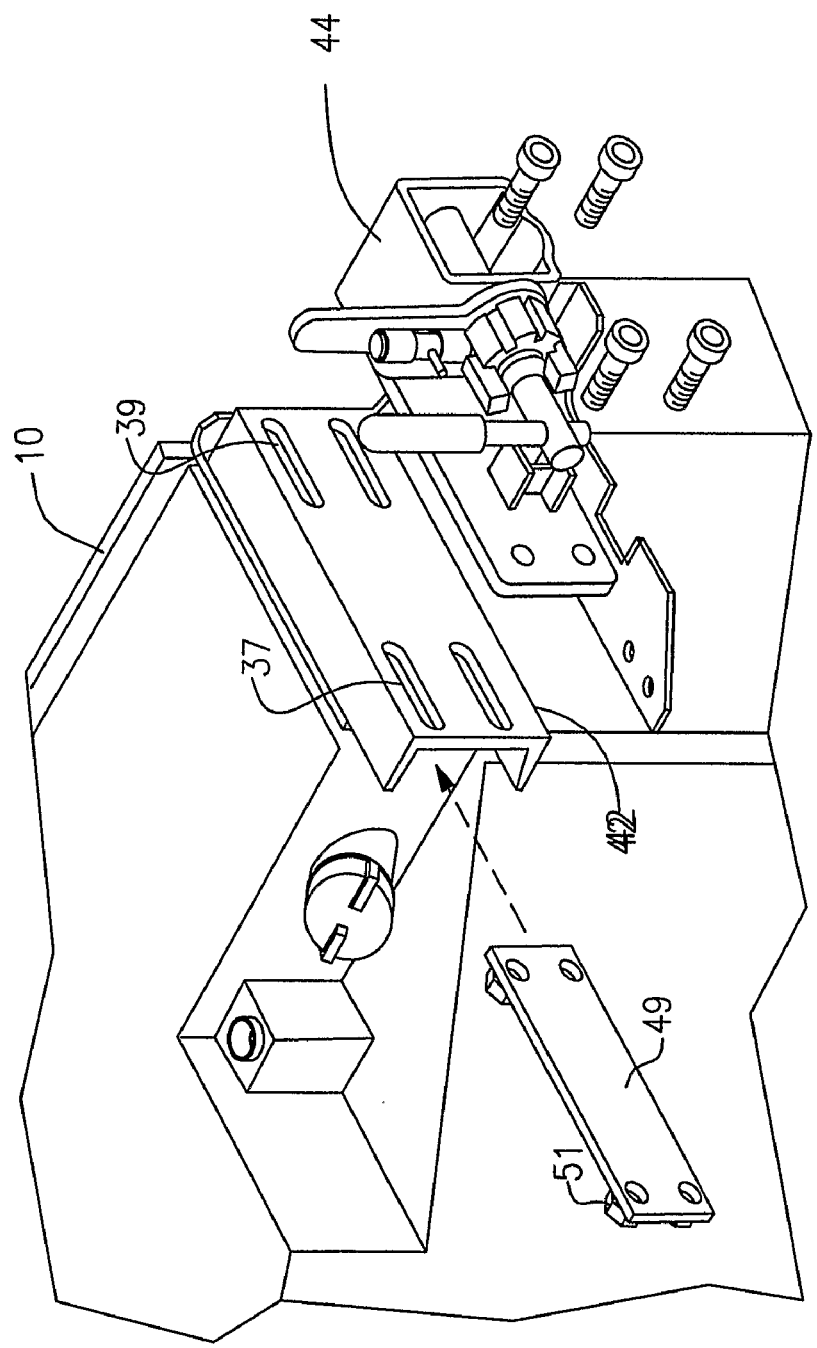
FIG. 17 is an exploded perspective view of another exemplary embodiment of the clamp-on mount of FIG. 1.

This slide plate 42, depicted using tee slots and tee nuts or non-round headed bolts, represents the clamp retracting mechanism, but is not limited to this form. Other forms such as a slotted plate with bolts and washers can be used instead. For example, in the embodiment illustrated in FIG. 17, the slide plate 42 is a C-channel mounted to the structure of the genset 10 and having an elongated plate section with a forward set of parallel slots 37 and a rearward set of parallel slots 39. The clamp mechanism 44 is mounted on the front face of the C-channel with each of the four mounting holes in the clamp mechanism aligned with a corresponding one of the slots 37 and 39. A nut plate 49 having four nuts 51 welded on the reverse face thereof is disposed in the C-section of the C-channel against the reverse face of the C-channel. To secure the clamp mechanism 44 in position, a cap head screw 45 is inserted through each mounting hole in the clamp mechanism 44 and through the corresponding slot of slots 37, 39, and then threaded into a corresponding nut 51 on the nut plate 49. To position the clamp mechanism 44 in its deployed position, the clamp mechanism is slid rearward, that is to the right in FIG. 17, along the slide plate 42 until the cap head screws 45 are positioned at the very rearward edges of the slots 37, 39 and the cap head screws 45 are then torqued down to secure the clamp mechanism in position. To position the clamp mechanism 44 in its stowed position, the clamp mechanism is slid forward, that is to the left in FIG. 17, along the slide plate 42 until the cap head screws 45 are positioned at the very forward edges of the slots 37, 39 and the cap head screws 45 are then torqued down to secure the clamp mechanism in position.

Figures 7, 8:
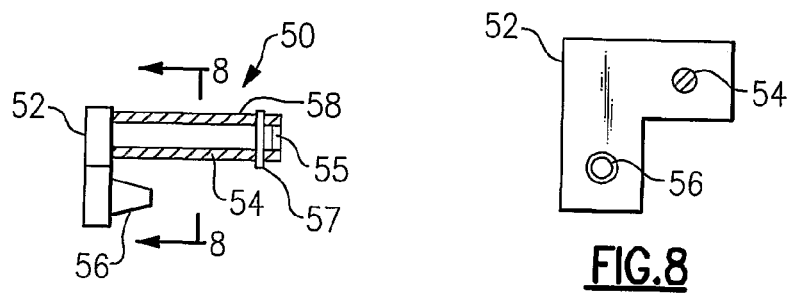
FIG. 7 is a elevation view of one exemplary embodiment of a pin-on mount.
FIG. 8 is plan view taken along line 8-8 of FIG. 7.

Referring now to FIGS. 7 and 8, to accommodate the pin-on mount 50 depicted therein, a section of the top back flange of the angle 14 is removed. Each pin-on mount 50 includes an L-shaped planar bracket 52 having a support shaft 54 extending downwardly from one end thereof and a mounting pin 56 extending downwardly from the other end thereof. When in its deployed for use position, as illustrated in FIGS. 1 and 3, the section of the L-shaped bracket supporting the mounting pin 56 extends into the respective gap in the upper flange of the angle 14 created by removing a section thereof. A post 58 is welded or otherwise mounted to the back panel of the genset frame or other suitable support structure associated with the genset frame. The post, which may be block-like, cylindrical or of other geometry, has a longitudinally extending hole 55 therethrough adapted to receive the support shaft 54. The hole 55 serves to index the mounting pin 56 when in the deployed for use position and also when in the stowed position. When the bracket 52 is disposed in the deployed for use position, the mounting pin 56 lies in alignment with the top flange of the angle 14.

To move the mounting pin to its stowed position, the bracket 52 is simply lifted upwardly until the mounting pin 56 is above the plane of the top flange of the angle 14 and then rotated inwardly so that mounting pin 56 is positioned inwardly of the back panel of the frame as illustrated in FIG. 2. Once so positioned, the bracket 52 is again lowered so that the support shaft 54 again extends fully into the hole 55 in the post 58. The intent is for the pin section to reside in the original position while in use, and be indexed inboard of back panel for storage while not in use. A retaining mechanism, such as for example a pin 57 extending through the post 58 and the support shaft 56 or a C-clip or an E-clip or other suitable means, may be provided for securing the support shaft 56 within the hole 55 of the post 58. Such a retainer mechanism will enhance the design by not allowing the part to be easily removed, either by actuation of a mechanical mechanism or through the use of a tool. The function of the retainer can provide a means of additional safety in the event that the post is able to become easily separated from the rail. The L-shape of the bracket 52 advantageously facilitates stowing of the pin-on mount assembly 50 by ensuring that the pin 56 is stowed in a position wherein interference with other components can not occur. However, the planar bracket is not limited to an L-shape.

Figure 9:
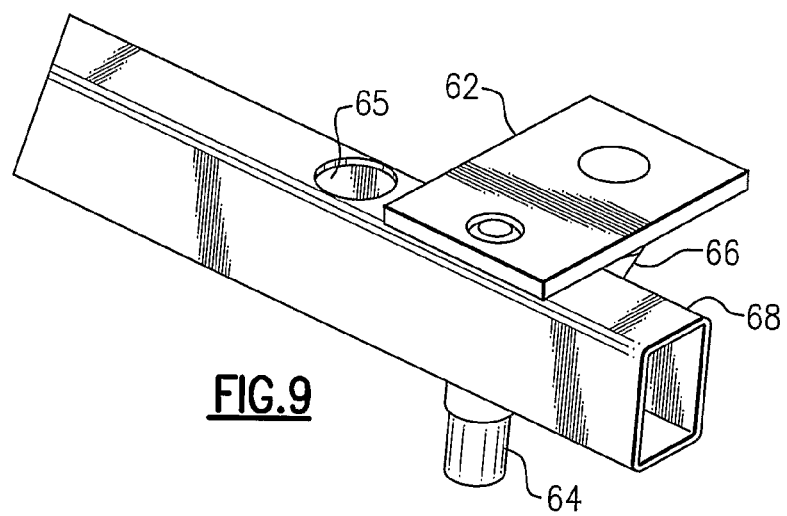
FIG. 9 is a perspective view of another exemplary embodiment of a pin-on mount.
Figure 10:
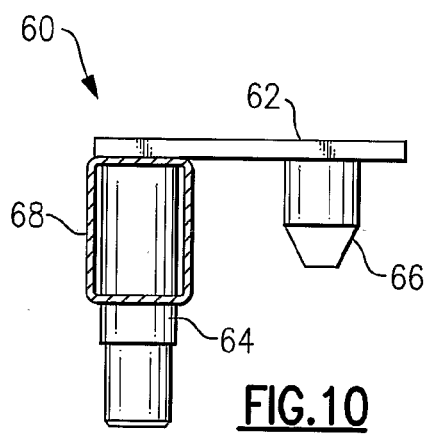
FIG. 10 is a elevation view of the pin-on mount of FIG. 9.

For example, in another embodiment depicted in FIGS. 9 and 10, the pin-on mount 60 may comprise a rectangular planar bracket 62 having a support shaft 64 extending downwardly from one end thereof and a mounting pin 66 extending downwardly from the other end thereof. The support shaft 64 is received in a hole in channel beam 68 which is mounted to the frame 12 so as to extend parallel and inboard of the angle 14. When the mounting pin 66 is deployed for use, the bracket 62 is rotated to extend outwardly from the channel beam 68 so as to extend the bracket beyond the back of the frame 12 and properly align the mounting pin 66 with its respective mounting receptacle on the container. To stow the mounting pin 66, the bracket 62 is lifted, rotated into alignment with the channel beam 68 and again lowered such that the mounting pin 66 is received into hole 65 in the channel beam 68 and the support shaft 64 is fully received within the channel beam 68.

Figure 11:
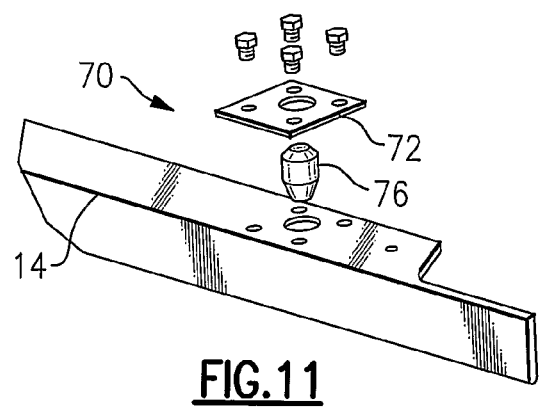
FIG. 11 is an exploded perspective view of another exemplary embodiment of the pin-on mount.

In a further embodiment depicted in FIG. 11, the pin-on mount may comprise a plate and pin assembly 70 including a plate 72 with an associated mounting pin 76 extending therethrough. To deploy the pin-on mount assembly 70 for mounting the generator set 10 to a container, the plate would be bolted to the top flange of the angle 14 such that the pin 76 would extend through an alignment hole in the angle 14 for attaching the generator set 10 to a structural member on the container in a well-known manner. When the clamp-on mount is used to mount the genset to a container, the plate and pin assembly 70 would be unbolted from the top flange of the angle 14 and removed and stowed on the genset for future use.

Figures 12, 13:
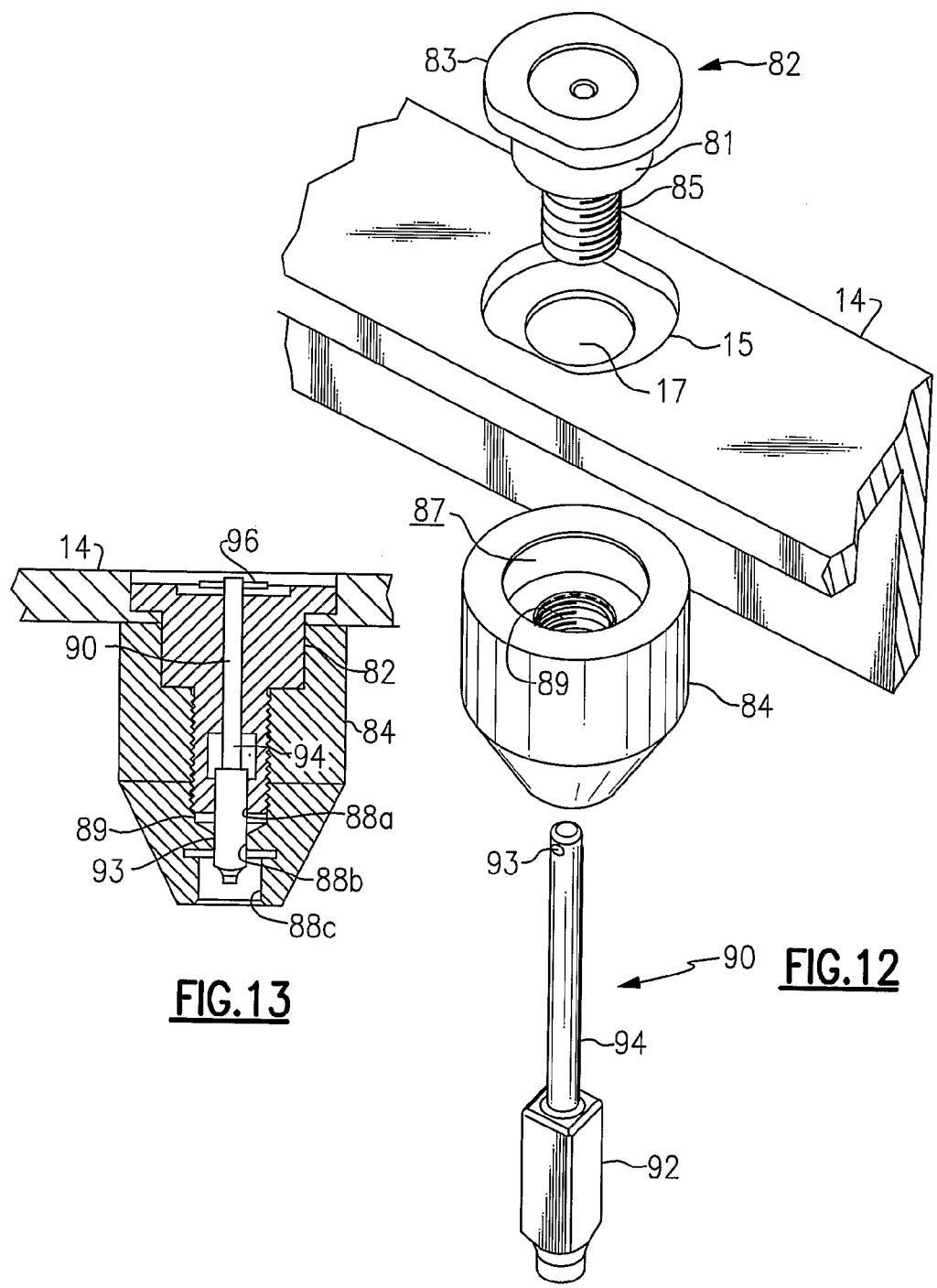
FIG. 12 is an exploded perspective view of additional exemplary embodiment of the pin-on mount.
FIG. 13 is an elevation view, partly in section, of the pin-on mount of FIG. 12 in its assembled and deployed position.

Referring now to FIGS. 12 and 13, there is depicted another exemplary embodiment of a pin-on mount for use in connection with a generator set having dual mounting capability in accord with the invention. The pin-on mount assembly 80 includes an upper pin body 82 and a lower pin body 84. The upper pin body 82 has a head 81 having a generally double-D-shaped top flange 83 and an externally threaded, cylindrical shaft 85 extending coaxially downwardly from the base of the head 81. The upper pin body 82 also has a central bore extending coaxially therethrough that has a larger diameter countersink portion at the upper end thereof and a portion 88a of non-circular cross-section at the lower distal end thereof. The lower pin body 84 has an annular body having a central bore 87 extending coaxially therethrough. The central bore 87 has an internally threaded portion 89 adapted to receive and engage the externally threaded shaft 85 when the upper pin body 82 and the lower pin body are assembled as depicted in FIG. 13 to secure the pin-on mount assembly 80 to the flange 14 of the generator set 10 to provide pin-on mount capability for attaching the generator set 10 to a structural member on the container in a well-known manner. The central bore 87 also has portions 88b and 88c of non-circular cross-section in the distal tip region of the lower pin body 84.

To assemble the pin-on mount assembly 80, the upper pin body 82 is inserted into a hole 15 in the flange 14 having a corresponding double-D-shaped countersink portion. The hole 15 has a central bore portion 17 which extends through the flange 14 and is sized diametrically to receive the shoulder portion of the head 81 of the upper pin body 82, but not the double D-shaped top flange 83 thereof. The corresponding non-circular structures of the double-D-shaped flange 83 and countersunk hole 15 ensure that the upper pin body 82 does not rotate during or subsequent to assembly in order to maintain assembly torque. With the upper pin body 82 inserted into the hole 15 such that the flange 83 is disposed within the hole 15 with the shaft 85 extending downwardly through the bore 17 in the flange 14, the lower pin body 84 is threaded onto the shaft 85 until the upper surface of the annular pin body 84 is tightly contacted with the lower surface of the flange 14.

When properly torqued, the lower pin body 84 should be sufficiently securely engaged on the shaft 85 of the upper pin body 82 to ensure that the lower pin body 84 will not be loosened by vibrations experienced during transport of the container to which the generator set is mounted. However, as a safe-guard, an anti-rotation pin 90 may be inserted upwardly into the central bore extending axially through the assembled pin-on mount assembly 80. The anti-rotation pin 90 has an axially elongated, non-circular head portion 92 and an axially elongated shaft 94 extending coaxially outwardly from an end face of the head portion 92. The shaft 94 has a transversely extending hole 93 passing through the distal tip thereof. As illustrated in FIG. 13, when fully inserted into the central bore of the assembled pin-on mount assembly 80, the shaft 94 of the anti-rotation pin 90 extends upwardly through the assembly 80 so that the distal tip thereof extends into a central countersink in the top flange 83 of the upper pin body 82 disposed in the countersink of the hole 15 in the flange 14. With the anti-rotation pin 90 so positioned a locking pin 96 in inserted into and through the transverse hole 93 in the distal tip of the shaft 85 to prevent the anti-rotation pin 90 from dropping out of the pin assembly 80.

Additionally, the non-circular cross-section head 92 of the anti-rotation pin 90 is positioned in both of the correspondingly non-circular shaped portion 88a of the central bore of the upper pin body 82 and the correspondingly non-circular shaped portion 88b of the central bore of the lower pin body 84. With its head 92 so positioned, the anti-rotation pin 90 prevents the lower pin body 84 from rotating relative to the upper pin body 82 due the corresponding non-circular cross-sections of the head 92, and the respective non-circular bore portions 88a and 88b. In the depicted exemplary embodiment, the head 92 of the anti-rotation pin 90 and the portions 88a and 88c of the bore 87 in the lower body 84 are square-shaped in cross-section. It is to be understood, however, that they may be of other non-circular shape, such as for example rectangular, hexagonal, octagonal or of other non-circular cross-section.

The lower portion 88c of the central bore of the lower pin body 84 is also provided with a non-circular shape to accommodate the drive head of a torque wrench. For example, the lower portion 88c of the central bore of the lower pin body 84 may have a square cross-section and be sized to receive a square drive head of a tool, such as a ratchet or torque wrench, thereby facilitating the torquing of the lower pin body 84 onto the threaded shaft 85 of the upper pin body 82 when the pin body assembly is assembled onto the flange 14 of the genset. It is to be understood, however, that the cross-section of the lower portion 88c of the central bore of the lower pin body 84 be of other non-circular shape, such as for example hexagonal, octagonal or of other non-circular cross-section. Alternatively, the lower pin body 84 could be provided with flat surface portions on it exterior to accommodate torquing of the lower pin body 84 onto the upper pin body 84 with a tool such as a box wrench. When it is desired to disassemble the lower pin body 84 from the upper pin body 82, the anti-rotation pin 90 is moved upwardly when the drive head of the tool is inserted into the portion 88c of the central bore of the lower pin body 84 for an distance sufficient to disengage the head 93 of the anti-rotation pin 90 from the non-circular portion 88b of the central bore of the lower pin body 84.

Figure 14:
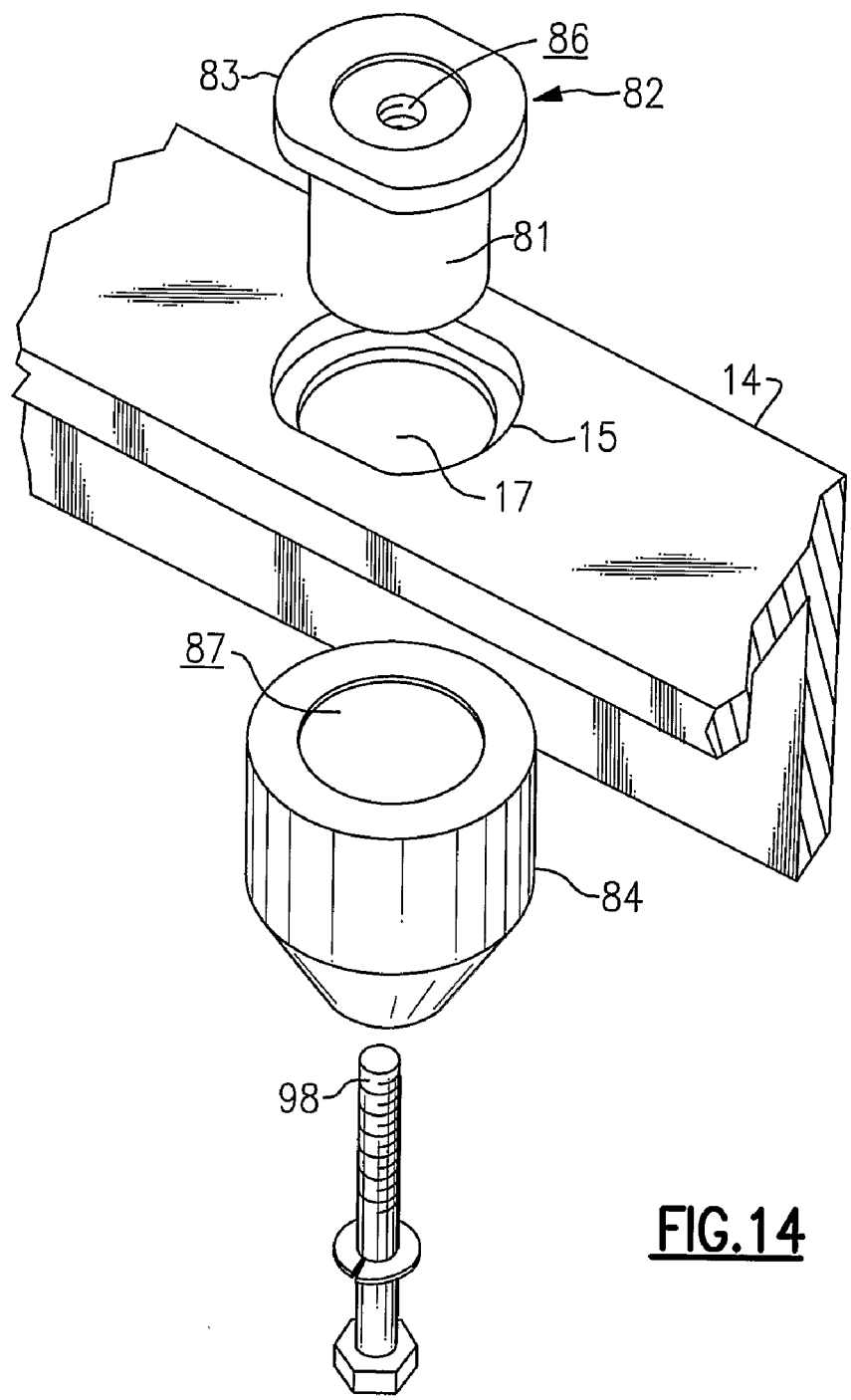
FIG. 14 is an exploded perspective view of an alternate embodiment of the pin-on mount of FIG. 12.

Referring now to FIG. 14, there is depicted an alternate embodiment of the pin-on mount assembly 80 wherein the upper pin body 82 and the lower pin body 84 are secured when assembled by means of a threaded bolt 98. In this embodiment, the upper pin body 82 has a axially elongated cylindrical head 81 having a generally double-D-shaped top flange 83 and a central bore 86 extending therethrough, at least of portion of which is internally threaded to engage the threads of the bolt 98. The lower pin body 84 has an annular body having a central bore 87 extending coaxially therethrough that is adapted to receive the head 81 when the upper pin body 82 and the lower pin body are assembled. When the lower pin body 84 is assembled unto the upper pin body 82, the bolt 98 is threaded into the central bore of the assembly to engage the internal threads on the central bore 86 of the upper pin body 82 and torqued 85 until the upper surface of the annular pin body 84 is tightly contacted with the lower surface of the flange 14. A lock washer is provided on the bolt 98 to prevent loosening of the bolt 98 due to vibration. Again, the corresponding non-circular structures of the double-D-shaped flange 83 and countersunk hole 15 ensure that the upper pin body 82 does not rotate during or subsequent to assembly in order to maintain assembly torque.

Figure 15:
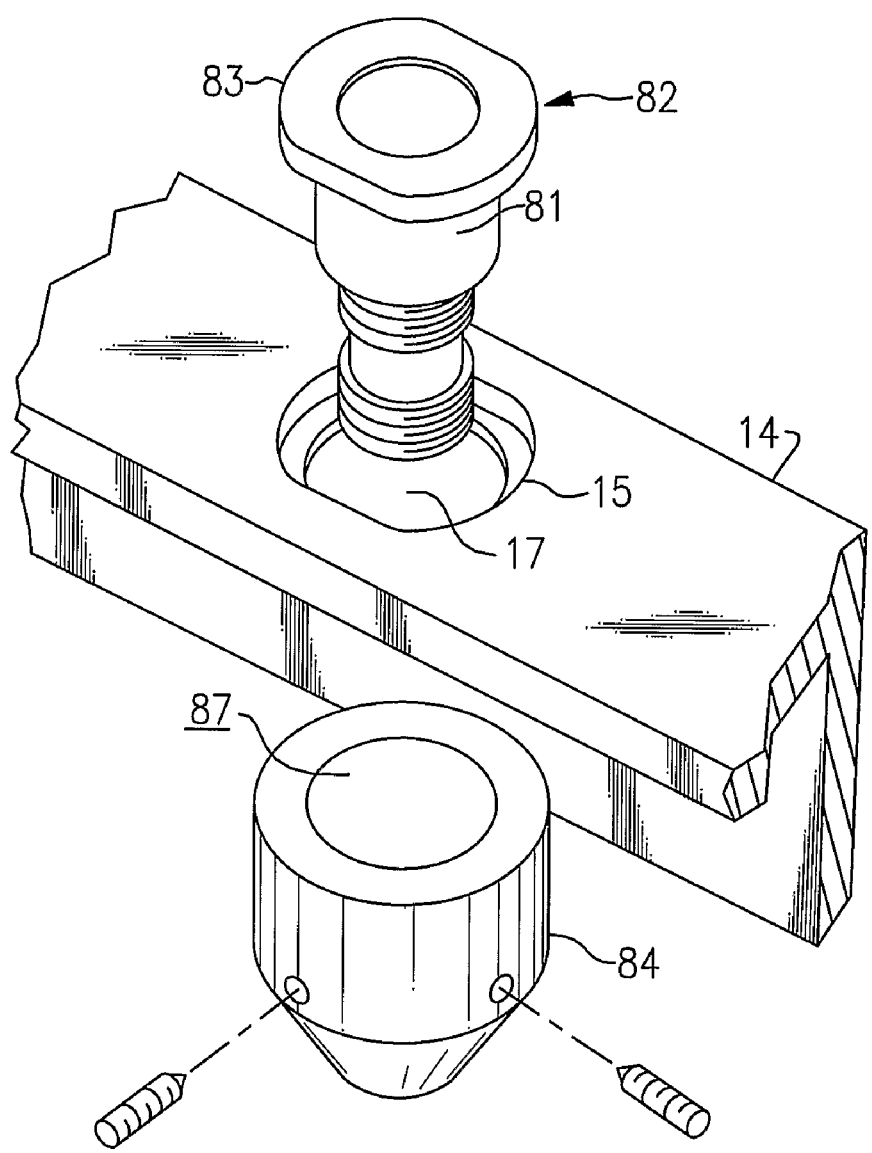
FIG. 15 is an exploded perspective view of an alternate embodiment of the pin-on mount of FIG. 12.

Referring now to FIG. 15, there is depicted an alternate embodiment of the pin-on mount assembly 80 wherein set screws 78 are employed as an anti-rotation safeguard against loosening of the assembled pin body due to vibration. The pin-on mount assembly 80 includes an upper pin body 82 and a lower pin body 84. The upper pin body 82 again has a head 81 having a generally double-D-shaped top flange 83 and an externally threaded, cylindrical shaft 85 extending coaxially downwardly from the base of the head 81. In this embodiment, a groove is cut circumferentially about a central portion of the cylindrical shaft to receive the distal ends of the set screws 78 when the pin bodies are assembled. The lower pin body 84 again has an annular body having a central bore 87 extending coaxially therethrough with the central bore 87 having an internally threaded portion adapted to receive and engage the externally threaded shaft 85 when the upper pin body 82 and the lower pin body 84 are assembled. The central bore 87 again has a lower portion of non-circular cross-section to facilitate the threading of the lower pin body 84 onto the shaft 85 of the upper pin body 82 by means of a torque wrench. With the lower pin body 84 assembled onto the upper pin body 84 and fully torqued down, the set screws 78 are threaded into radially-directed set screw holes 79 such that the distal ends of the set screws 78 engage the groove provided on the shaft 85 of the upper pin body 82.

Figure 16:
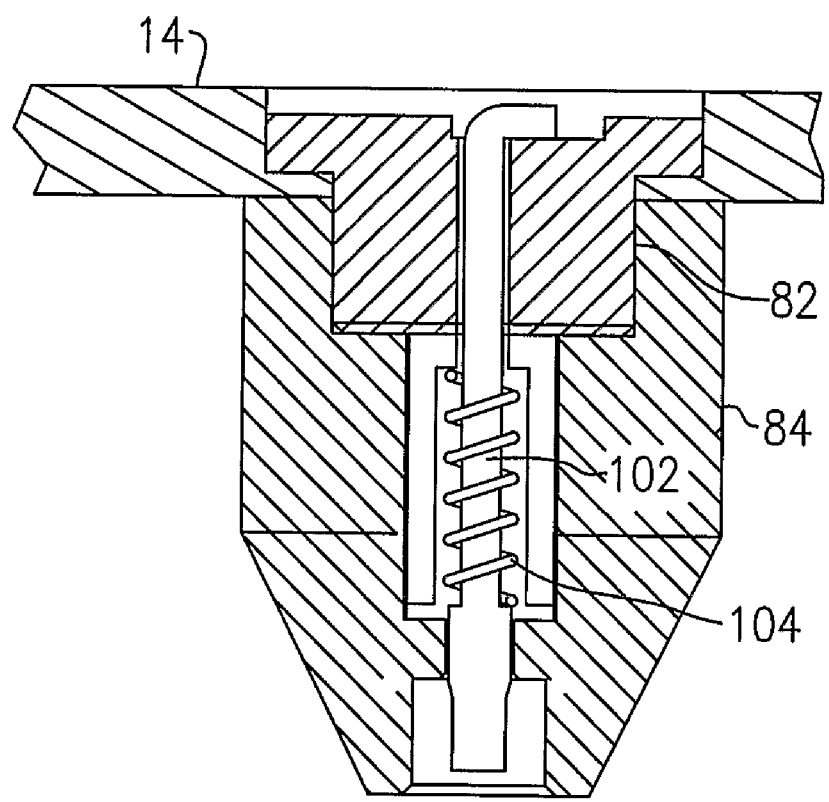
FIG. 16 is an elevation view, partly in section, of an alternate embodiment of the pin-on mount of FIG. 12 in its assembled and deployed position.

Referring now to FIG. 16, there is depicted an alternate embodiment of the pin-on mount assembly 80 wherein the assembled upper pin body 82 and lower pin body 84 are further secured by means of a spring-biased anti-rotation pin 102. In this embodiment, the upper pin body 82 and the lower pin body 84 are of the same general construction as described hereinbefore with respect to the embodiment depicted in FIGS. 12 and 13. The upper pin body 82 has a head 81 having a generally double-D-shaped top flange 83 and an externally threaded, cylindrical shaft 85 extending coaxially downwardly from the base of the head 81. The upper pin body 82 also has a central bore extending coaxially therethrough that has a larger diameter countersink portion at the upper end thereof and a portion 88a of non-circular cross-section at the lower distal end thereof. The lower pin body 84 has an annular body having a central bore extending coaxially therethrough. The central bore 87 has an internally threaded portion adapted to receive and engage the externally threaded shaft 85 when the upper pin body 82 and the lower pin body are assembled as depicted. The central bore also has portions 88b and 88c of non-circular cross-section in the distal tip region of the lower pin body 84.

When the lower pin body 84 is threaded onto the upper pin body 82 as hereinbefore described with respect to the embodiment depicted in FIGS. 12 and 13 and properly torqued, the anti-rotation pin 102, together with an associated coil spring 104, are inserted upwardly into the central bore extending axially through the assembled pin-on mount assembly. The anti-rotation pin 102 has an axially elongated, non-circular head portion and an axially elongated shaft extending coaxially outwardly from an end face of the head portion. The coil spring 104 is disposed coaxially about and carried on the shaft of the anti-rotation pin 102. When fully inserted into the central bore of the assembled pin-on mount assembly, the distal tip of the shaft of the anti-rotation pin 102 that extends upwardly through the assembly into the central countersink in the top flange of the upper pin body 82 is bent over to prevent the anti-rotation pin from dropping out of the pin assembly. In the process of fully inserting the anti-rotation pin 102 into the pin body assembly, the coil spring 104 is compressed, whereby a biasing force is established that keeps the bent over distal tip of the anti-rotation pin 102 engaged with the surface of the countersink hole in the top flange of the upper pin body 83, thereby locking the anti-rotation pin 102 in position. The coil spring 104 could similarly be employed in the embodiment depicted in FIGS. 12 and 13. Additionally, a cross-pin 96 shown in FIG. 13 and the bent over distal tip may be interchanged as a means for locking the distal tip either anti-rotation pin 90 or 102 in its installed position.

The invention has been described herein with reference to the exemplary embodiments depicted in the drawings for purposes of illustration and to facilitate understanding of the invention. Those skilled in the art will realize that modifications may be made to the depicted embodiments without departing from the spirit and scope of the invention.

We claim:

1. A generator set for use as a power supply for a refrigerated freight container, said generator set adapted to be face mounted to the refrigerated freight container selecting between using a clamp-on mount and a pin-on mount, said generator characterized in that said pin-on mount comprises an upper pin body and a lower pin body adapted to be assembled together in engagement with a structural member of said generator set, said upper pin body has a downwardly directed axially extending shaft having an externally threaded portion, and said lower pin body has a central bore extending therethrough having an internally threaded portion adapted to receive and engage the externally threaded portion of the shaft of said upper pin body, and further characterized in that a lower distal end of the central bore of the lower pin body has a non-circular cross-section adapted to receive a drive head of a tool for torquing said lower pin body onto the threaded shaft of said upper pin body.

2. The generator set as recited in claim 1 further characterized by at least one set screw extending radially through said lower pin body to engage the shaft of said upper pin body when said lower pin body has been assembled to said upper end body to prevent relative rotation between said upper pin body and said lower pin body.

3. The generator set as recited in claim 1 further characterized in that said upper pin body has a central bore extending coaxially therethrough having a lower portion of non-circular cross-section and the central bore of said lower pin body has a portion of corresponding non-circular cross-section.

4. The generator set as recited in claim 3 further characterized by an anti-rotation member having a non-circular head and a shaft extending axially therefrom, said anti-rotation pin inwardly through the central bores of said lower pin body and said upper pin body with the head of said anti-rotation pin positioned in both the non-circular cross-section portion of the central bore of said lower pin body and the non-circular cross-section portion of the central bore of said upper pin body.

5. A generator set for use as a power supply for a refrigerated freight container, said generator set adapted to be face mounted to the refrigerated freight container selecting between using a clamp-on mount and a pin-on mount, said generator set including both a structural member adapted for mounting the clamp-on mount thereto and a structural member adapted for mounting the pin-on mount thereto characterized in that said structural member adapted for mounting the pin-on mount thereto comprises a flange having a hole passing therethrough for receiving said pin-on mount, the hole having a non-circular countersink.

6. The generator set as recited in claim 5 further characterized in that said pin-on mount comprises an upper pin body and a lower pin body adapted to be assembled together in engagement with said flange disposed therebetween, said upper pin body having a non-circular top flange adapted to be received in the non-circular countersink in said flange.

* * * * *